No. 680,712.  
Patented Aug. 20, 1901.
E. T. HILL & T. J. HIGHTOWER.
BALING PRESS.
(Application filed Sept. 5, 1900.)
(No Model.)  
2 Sheets—Sheet 1.
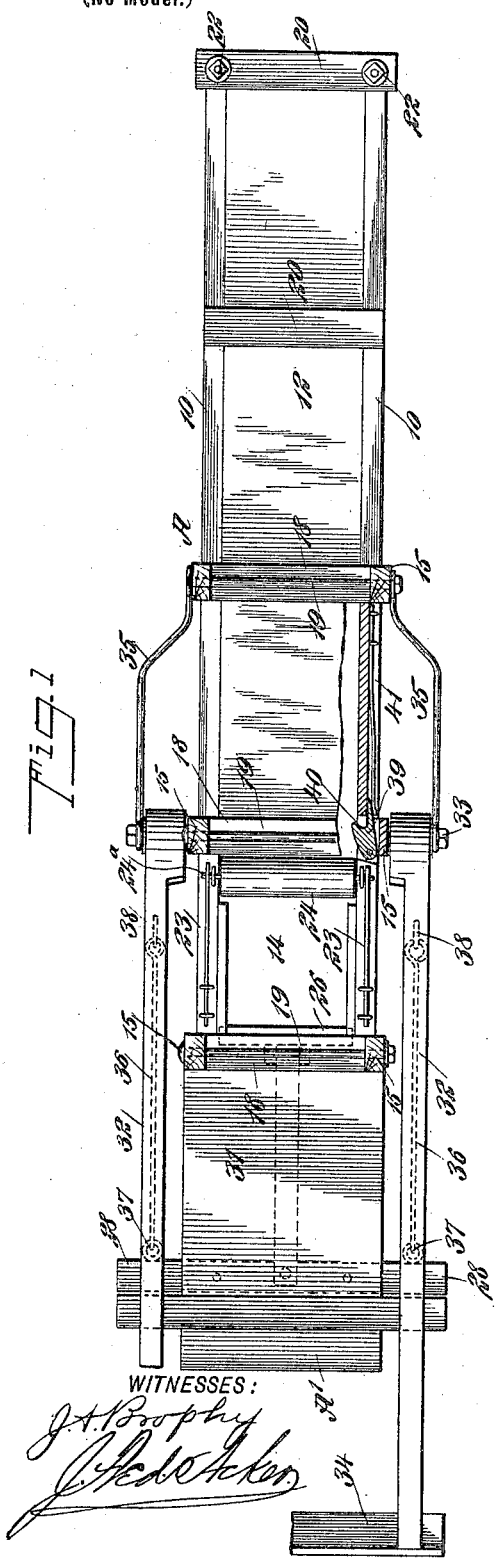
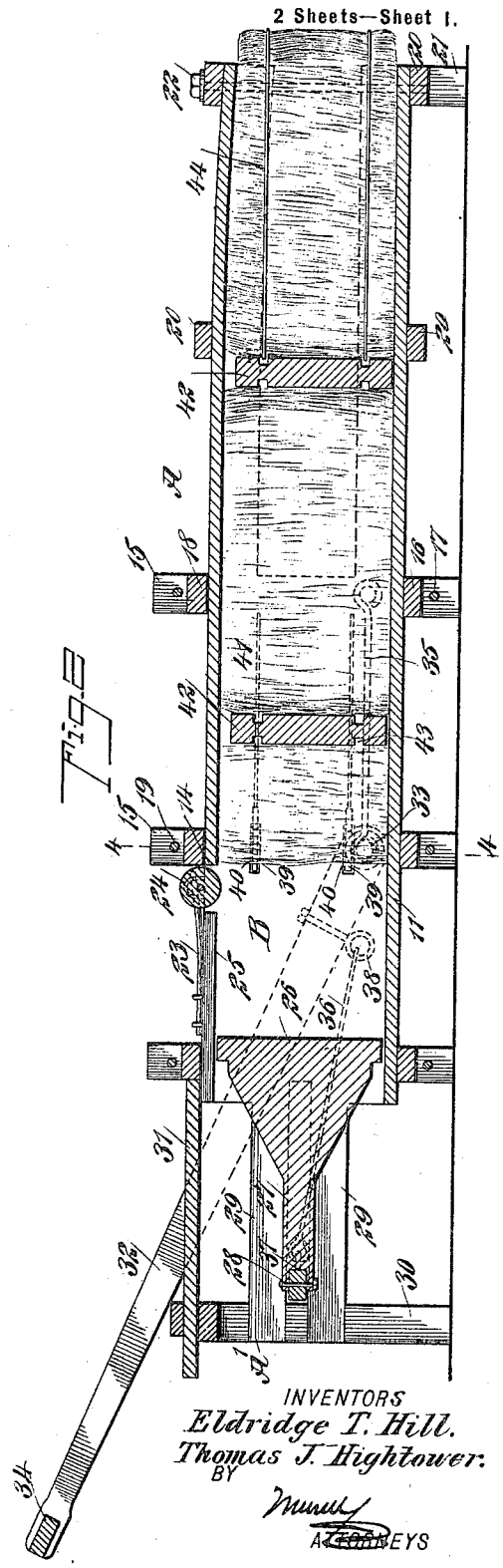
WITNESSES:
INVENTORS  
Eldridge T. Hill.  
Thomas J. Hightower.  
BY  
ATTORNEYS
THE NORRIS PETERS CO., PHOTO-LITHO., WASHINGTON, D. C.

No. 680,712. Patented Aug. 20, 1901.
E. T. HILL & T. J. HIGHTOWER.
BALING PRESS.
(Application filed Sept. 5, 1900.)
(No Model.) 2 Sheets—Sheet 2.
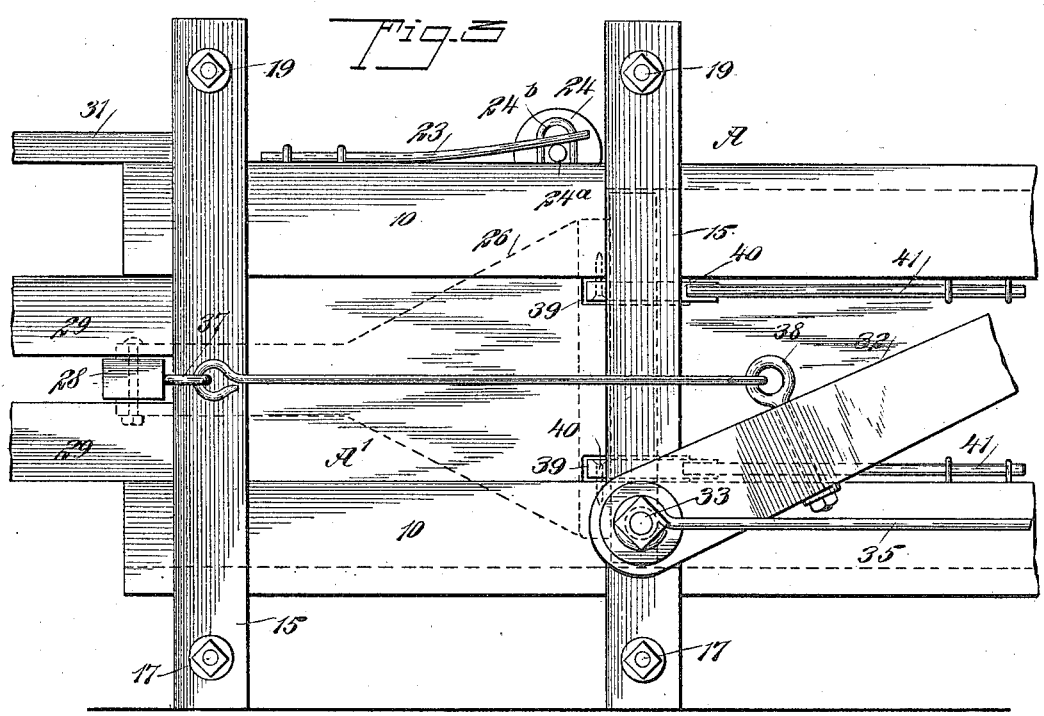
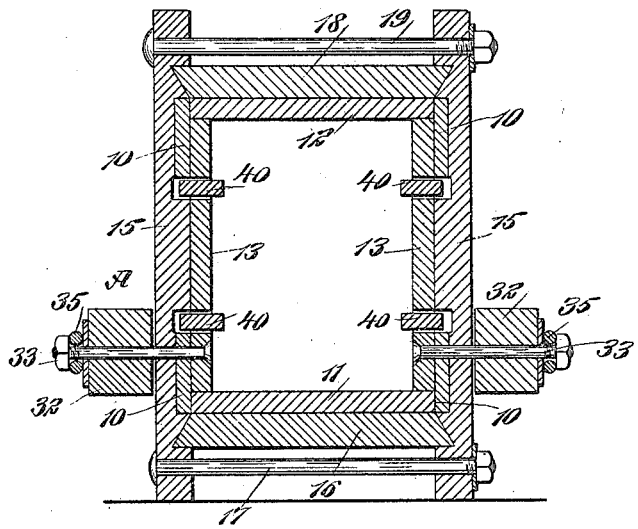
WITNESSES:
INVENTORS
Eldridge T. Hill.
Thomas J. Hightower.
BY
ATTORNEYS

UNITED STATES PATENT OFFICE.

ELDRIDGE T. HILL AND THOMAS J. HIGHTOWER, OF MURFREESBORO, TENNESSEE.

BALING-PRESS.

SPECIFICATION forming part of Letters Patent No. 680,712, dated August 20, 1901.

Application filed September 5, 1900. Serial No. 29,029. (No model.)

*To all whom it may concern:*

Be it known that we, ELDRIDGE T. HILL and THOMAS J. HIGHTOWER, citizens of the United States, and residents of Murfreesboro, in the county of Rutherford and State of Tennessee, have invented a new and Improved Baling-Press, of which the following is a full, clear, and exact description.

One purpose of the invention is to provide a construction of baling-press which may be manually operated with great power and wherein a series of bales may be formed and the loose bale in the press conveniently tied while the other bales are in process of formation.

Another purpose of the invention is to so construct a press that it will be simple, yet durable, lever-operated, and not liable to disarrangement, and, furthermore, to so construct the press that a bale will be perfectly formed and whereby the bale leaving the press will serve as a bulkhead for the material which is being formed into a bale.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1 is a plan view of the improved press, portions thereof being broken away. Fig. 2 is a longitudinal vertical section through the press, showing one bale as just leaving the press, a second bale formed within the press, and a third bale in process of formation. Fig. 3 is an enlarged side elevation of a portion of the body of the press and an extension therefrom, and Fig. 4 is a transverse vertical section taken practically on the line 4 4 of Fig. 2.

A represents the body of the press, and this body preferably consists of upper and lower side longitudinal beams 10 of any suitable dimensions, a bottom 11 extending from one end of the body to the other, a top 12 nearly of the same length as the bottom, and side boards 13, which extend from the front of the press to a point at or near the center, the remaining side portions and the back of the body being open. The top 12 at the front has an opening 14 therein, through which the straw is passed into the front portion of the baling-chamber B, the forward end of which is open. The body is strengthened by uprights 15, placed at suitable intervals apart at the sides of the body, extending above and below the same, and the bottom portions of these uprights constitute legs. Transversely-opposing uprights are connected by bottom beams 16, as shown in Fig. 4, which interlock with the uprights, and bolts 17 are likewise passed through the uprights below the said bottom beam, while at the top portion of the body upper transverse beams 18 are located, having interlocking connection with transversely-opposing uprights 15, as is also shown in Fig. 4, and the upper end portions of transversely-opposing uprights 15 are connected by bolts 19 or similar devices. These uprights are placed at the inclosed side portions only of the body, and at the top and the bottom of that portion of the body which is open at the sides transverse cleats or bars 20 are located and secured, and the rear end of the body is supported by suitable legs 21.

The upper board or top 12 of the body is drawn toward the bottom board 11 to a greater or less extent at the rear portion of the body through the medium of bolts 22, having suitable nuts applied thereto, the purpose being to make the outlet of said body of less height than the inlet and the baling-chamber.

A roller 24 is mounted to turn at the rear portion of the opening 14 of the body, which receives the straw or hay. This roller 24 is adapted to tuck the ends of the hay down in the baling-chamber, and thus make the top of the bale even. This roller 24 has trunnions 24$^a$, (shown in Figs. 1 and 3,) which are journaled in suitable bearings 24$^b$, and the roller is held down to its work by means of springs 23, which have bearing upon the trunnions. The said springs are attached to the upper side portions of the body of the press at the opening 14. Guide strips or battens 25 are attached to the inner faces of the baling-chamber, extending from a point in front of the roller 24 to the forward end of the said chamber, as is shown in Figs. 1 and 2, and a plunger 26 is mounted to slide in the baling-chamber below the opening 14 and between the guides or battens 25 and bottom 11 of the body. This plunger is provided with a forwardly-extending stem 27, and said stem is attached to the central portion of a cross-bar 28, which cross-bar extends out between and beyond side strips 29, forming the side portions of a front extension A' of the body A, the side strips being secured to the body proper and to uprights 30. This extension A' is covered at the top by a platform 31, upon which the operators stand, and these operators are expected to manipulate levers 32, which levers are pivotally attached to the side portions of the body at about the central part of the inclosed side portions thereof, the pivot-pins 33 of the levers being preferably placed near the lower portion of the sides of the body. The levers 32 are connected at their upper or free ends by a cross-bar 34, which serves as a handle for the operators, and suitable braces 35 are provided for the pivots 33 of the said levers 32. The levers 32 are connected by links 36 with eyes 37 or their equivalents, attached to the cross-bar of the plunger 26, and eyes 38, which are attached to the levers 32. When the plunger 26 is in its forward position or in a position to permit straw or hay to enter the baling-chamber, the levers 32 are in the forward-inclined position illustrated in Fig. 2.

Slightly to the rear of the roller 24 and below said roller the baling-chamber is provided at its sides near the top and near the bottom with longitudinal openings 39, and fork-shaped retainers 40 extend into the baling-chamber through these openings, as shown best in Fig. 1. These retainers permit the baled material to pass rearward, since the bale can slip by the retainers, forcing them outward; but the retainers effectually prevent the material from working back after said material has once passed the retainers. The retainers 40 are held in their working position by springs 41, having bearing against outer rearward extensions of the retainers, the said springs being located, preferably, at the outside of the body A, being secured to said body at one end in any suitable or approved manner.

In operation when sufficient straw or hay has been placed in the baling-chamber B to form a bale and the hay or straw has been rendered compact and forced toward the outlet of the body a spacing-block 42 is placed in front of the forward portion of the bale thus formed, and this spacing-block is provided with upper and lower grooves in opposite sides. More straw or hay is now placed in the baling-chamber, and a second bale is commenced, and as the second bale is formed the first bale is forced gradually rearward until the said bale first formed reaches the open portion of the sides of the body, whereupon the bale is provided with suitable ties 44, which are readily passed around the bale by reason of the grooves in the spacing-blocks 42. When the completed and tied bale reaches the rear or outlet end of the body, said end, being contracted, causes the bale to pass out therefrom with some difficulty, thus forming a bulkhead against which other bales in process of formation may be pressed, so as to render them exceedingly compact.

It will be understood that a spacing-block 42 is placed between the various bales formed, so as to enable the bales to be readily tied.

Having thus described our invention, we claim as new and desire to secure by Letters Patent—

1. A baling-press comprising a body provided with a baling-chamber having a top opening to receive the material, a plunger arranged to move in said baling-chamber, a platform located at the top of the body in advance of said opening, an operating-lever fulcrumed on the body at the rear of the baling-chamber and projecting forwardly and upwardly above the said platform, and an operative connection extending forwardly from the lever to the plunger.

2. A baling-press comprising a body provided with a baling-chamber having a top opening to receive the material, a plunger arranged to move in said baling-chamber, a platform located at the top of the body in advance of said opening, operating-levers fulcrumed near the bottom of the body at opposite sides thereof, and extending adjacent to the platform, a cross-bar connecting the front ends of said levers and extending over the platform, said cross-bar forming an operating-handle, and an operative connection between said levers and the plunger.

In testimony whereof we have signed our names to this specification in the presence of two subscribing witnesses.

ELDRIDGE T. HILL.
THOMAS J. HIGHTOWER.

Witnesses:
R. J. PATTERSON,
J. H. CRICHLOW.